(12) United States Patent
Goettke et al.

(10) Patent No.: US 8,362,098 B2
(45) Date of Patent: Jan. 29, 2013

(54) PROCESS FOR PRODUCING VISCOELASTIC POLYURETHANE FOAMS

(75) Inventors: Stephan Goettke, Bakum (DE); Heinz-Dieter Lutter, Lembruch (DE); Berend Eling, Lemfoerde (DE); Steven Edward Wujcik, Pundong (CN); Jens Mueller, Lohne (DE)

(73) Assignee: BASF SE, Ludwigshafen (DE)

( * ) Notice: Subject to any disclaimer, the term of this patent is extended or adjusted under 35 U.S.C. 154(b) by 631 days.

(21) Appl. No.: 12/095,754

(22) PCT Filed: Nov. 30, 2006

(86) PCT No.: PCT/EP2006/069092
§ 371 (c)(1),
(2), (4) Date: Jun. 2, 2008

(87) PCT Pub. No.: WO2007/065837
PCT Pub. Date: Jun. 14, 2007

(65) Prior Publication Data
US 2008/0300335 A1      Dec. 4, 2008

(30) Foreign Application Priority Data

Dec. 5, 2005 (DE) .......................... 10 2005 058 090

(51) Int. Cl.
*C08G 18/06* (2006.01)
*C08G 18/08* (2006.01)
*C08G 18/48* (2006.01)
*C08G 18/72* (2006.01)
*C08G 18/28* (2006.01)

(52) U.S. Cl. ........ 521/170; 521/171; 521/174; 521/914; 528/48; 528/76; 528/77; 528/85

(58) Field of Classification Search .................. 521/170, 521/174, 171, 914; 528/48, 76, 77, 85
See application file for complete search history.

(56) References Cited

U.S. PATENT DOCUMENTS

| 6,653,363 B1 | 11/2003 | Tursi, Jr. et al. |
| 2004/0044091 A1 | 3/2004 | Niederoest et al. |
| 2004/0254256 A1* | 12/2004 | Lockwood et al. ............ 521/174 |

FOREIGN PATENT DOCUMENTS

| EP | 1240228 B1 * | 8/2003 |
| WO | 93 05091 | 3/1993 |
| WO | 01 25305 | 4/2001 |
| WO | WO-01-32736 A1 * | 5/2001 |
| WO | 02 088211 | 11/2002 |
| WO | 03 046041 | 6/2003 |

* cited by examiner

*Primary Examiner* — Michael Pepitone
(74) *Attorney, Agent, or Firm* — Oblon, Spivak, McClelland, Maier & Neustadt, L.L.P.

(57) ABSTRACT

A process for producing viscoelastic flexible polyurethane foams by reacting a) polyisocyanates with b) compounds having at least two hydrogen atoms which are reactive toward isocyanate groups, c) blowing agents, wherein b) comprise b1) from 70 to 10 parts by weight of at least one polyether alcohol having polyoxypropylene units, a nominal functionality of from 3 to 6 and a hydroxyl number of 100 to 300 mg KOH/g, b2) from 10 to 70 parts by weight of at least one polyetherol having polyoxypropylene units, a nominal functionality of 2 and a hydroxyl number of 50 to 350 mg KOH/g, b3) from 10 to 30 parts by weight of at least one polyether alcohol having ethylene oxide units, a nominal functionality of from 2 to 3 and a hydroxyl number of 50 to 550 mg KOH/g, b4) from 0 to 20 parts by weight of at least one graft polyetherol having a nominal functionality of from 2 to 3 and a hydroxyl number of 20 to 40 mg KOH/g.

18 Claims, No Drawings

US 8,362,098 B2

PROCESS FOR PRODUCING VISCOELASTIC POLYURETHANE FOAMS

CROSS REFERENCE TO RELATED APPLICATIONS

This application is a 371 National Stage Application of PCT/EP06/69092, filed on Nov. 30, 2006, claiming priority of German Application No. 102005058090.4, filed Dec. 5, 2005.

The invention relates to a process for producing viscoelastic flexible polyurethane foams by reacting polyisocyanates with compounds having at least two hydrogen atoms which are reactive toward isocyanate groups.

Viscoelastic flexible polyurethane foams have attained ever greater importance in recent years. They are used, in particular, for producing upholstery, mattresses or for damping of vibrations, for example in foam backing of carpets.

Viscoelastic flexible polyurethane foams have a glass transition temperature which is in the vicinity of room temperature.

The glass transition temperature is determined by means of dynamic-mechanic analysis (DMA) at a frequency of 1 Hz in the temperature range from −80 to +200° C. The viscoelastic flexible foams of the invention have an absolute maximum value of the loss modulus tan delta in the temperature range from −10 to 40° C., preferably from −10 to 35° C. and in particular from −6 to 35° C. The viscoelastic foams have, in particular, a rebound resilience in accordance with DIN EN ISO 8307 of less than 30% and a high damping performance reflected in a tan delta value of >0.2 at room temperature.

The viscoelastic properties are preferably set by choice of the starting materials, in particular the polyols.

One possible way of producing viscoelastic foams is the use of mixtures of preferably trifunctional polyether alcohols having a hydroxyl number of from 20 to 100 and at least one preferably trifunctional polyether alcohol having a hydroxyl number in the range from 160 to 250 and substantially propylene oxide units in the chain.

A disadvantage of such foams is that, particularly when tolylene diisocyanate (TDI) is used as polyisocyanate, their high proportion of closed cells which leads to problems in processing and to relatively poor mechanical properties.

Furthermore, the viscoelastic properties can be achieved by using mixtures of at least one polyether alcohol having a high content of ethylene oxide, preferably at least 50% by weight, and at least one polyether alcohol which is incompatible with the first polyether alcohols and has a high content of propylene oxide, preferably at least 90% by weight, as compounds having at least two hydrogen atoms which are reactive toward isocyanate groups.

Thus, US 2004/0254256 describes viscoelastic foams in whose production the polyol component comprises from 30 to 70 parts by weight of a polyether alcohol having a high proportion of ethylene oxide units in the polyether chain. EP 1 240 228 describes the production of viscoelastic foams using polyether alcohols which have a content of ethylene oxide in the polyether chain of at least 50% by weight and a hydroxyl number in the range from 40 to 50.

The use of the ethylene oxide-rich polyether alcohols increases the proportion of open cells in the foams. A disadvantage of the use of polyether alcohols having a high proportion of ethylene oxide in the chain is the increase in the hydrophilicity of the foams. As a result of this, these foams swell by up to 40% by volume in contact with water. This swelling behavior is unacceptable for applications in most environments.

A further possible way of setting viscoelastic properties is the addition of plasticizers and/or monools, as described, for example, in WO 02/088211. WO 01/25305 additionally describes the use of 30-70 parts of polymer polyol for producing viscoelastic foams.

WO 04/0254256 describes a process for producing viscoelastic foams, in which a mixture of at least one ethylene oxide-rich polyether alcohol and at least one propylene oxide-rich polyether alcohol is used as polyol component. The hydrophilicity of the foams can be adjusted via the ratio of the polyols used.

A disadvantage of this process is once again the fact that the foams have a hydrophilicity which is too high for many applications.

It was an object of the present invention to provide viscoelastic hydrophobic flexible polyurethane foams which have good mechanical properties, ten, in particular an optimal compression set, in both the dry state and the moist state and can be produced without problems regardless of the polyisocyanate used.

This object has surprisingly been able to be achieved by the compounds having at least two hydrogen atoms which are reactive toward isocyanates comprising a trifunctional polyether alcohol which is made up substantially of propylene oxide, a bifunctional polyether alcohol which is made up substantially of propylene oxide and a polyether alcohol which is made up substantially of ethylene oxide in a specific ratio to one another.

The invention accordingly provides a process for producing viscoelastic flexible polyurethane foams by reacting
a) polyisocyanates with
b) compounds having at least two hydrogen atoms which are reactive toward isocyanate groups,
c) blowing agents,
wherein the compounds having at least two hydrogen atoms which are reactive toward isocyanate groups b) comprise
b1) from 70 to 10 parts by weight of at least one polyether alcohol consisting of exclusively polyoxypropylene units or polyoxypropylene units and not more than 20% by weight, based on the total weight of the alkylene oxides used, of polyoxyethylene units in the polyether chain and having a nominal functionality of from 3 to 6 and a hydroxyl number in the range from 100 to 300 mg KOH/g,
b2) from 10 to 70 parts by weight of at least one polyetherol consisting of exclusively polyoxypropylene units or polyoxypropylene units and not more than 20% by weight, based on the total amount of alkylene oxides used, of polyoxyethylene units in the polyether chain and having a nominal functionality of 2 and a hydroxyl number in the range from 50 to 350 mg KOH/g,
b3) from 10 to 30 parts by weight of at least one polyether alcohol consisting of exclusively ethylene oxide units or ethylene oxide units and not more than 20% by weight, based on the total amount of alkylene oxides used, of polyoxypropylene units in the polyether chain and having a nominal functionality of from 2 to 3 and a hydroxyl number in the range from 50 to 550 mg KOH/g,
b4) 0-20 parts by weight of at least one graft polyetherol which can be prepared by in-situ polymerization of olefinically unsaturated monomers in a polyether alcohol consisting of polyoxypropylene units or polyoxypropylene units and not more than 50% by weight, based on the total amount of alkylene oxides used, of polyoxyethylene units in the polyether chain and having a nominal functionality of 2-3 and a hydroxyl number in the range 20-40 mg KOH/g.

The functionality of the mixture of b1) and b2) is preferably in the range from >2 to 3.

The ratio of the sum of the parts by weight of b1) and b2) to b3) (b1+b2)/b3 is preferably in the range from 90/10 to 70/30.

The ratio of the sum of b1) and b2) to b4) (b1+b2)/b4 is preferably in the range from 100/0 to 80/20.

When two alkylene oxides are used for the polyether alcohols b1) to b4), these can be added on in the form of blocks or randomly.

It is in principle possible to use all known compounds having at least two isocyanate groups in the molecule as polyisocyanates a). Preference is given to using diisocyanates. Diphenylmethane diisocyanate (MDI) and/or tolylene diisocyanate (TDI) are preferably used for the process of the invention.

When TDI is used, mixtures of the 2,4 isomer and the 2,6 isomer are usually employed. Commercial mixtures comprising 80% of 2,4-TDI and 60% of 2,6-TDI and 35% of 2,4-TDI and 35% of 2,6-TDI are particularly preferred.

When MDI is used, it is possible to use the pure 4,4' isomer, the pure 2,4' isomer and also any mixtures of the two isomers which can further comprise up to 5% by weight of the 2,2' isomer. Use is frequently made of modified isocyanates in place of the pure isocyanates or in admixture therewith, since pure MDI as a solid is difficult to process. Such modified isocyanates can be formed, for example, by incorporation of groups into the polyisocyanates. Examples of such groups are urethane, allophanate, carbodiimide, uretonimine, isocyanurate, urea and biuret groups. Particular preference is given to isocyanates modified with urethane groups, which are usually prepared by reacting the isocyanates with a substoichiometric amount of H-functional compounds. Such compounds are frequently also referred to as NCO prepolymers. Particular preference is likewise given to carbodiimide- or uretonimine-comprising polyisocyanates which can be formed by targeted catalytic reaction of isocyanates with themselves. Furthermore, it is possible to use mixtures of TDI and MDI.

The polyether alcohols used for the process of the invention can be prepared by the customary and known methods. This is usually achieved by base-catalyzed, usually alkali-catalyzed, addition of lower alkylene oxides, usually ethylene oxide and/or propylene oxide, onto hydroxyl-functional starter substances.

As starter substances for the bifunctional polyether alcohols b2), use is usually made of water and/or bifunctional alcohols such as ethylene glycol and/or propylene glycol.

As starter substances for the trifunctional polyether alcohols b1), use is usually made of 3-functional alcohols such as glycerol or trimethylolpropane (TMP).

In the preparation of the polyether alcohols b3), it is possible to use the abovementioned bifunctional and trifunctional starter substances either individually or in the form of any mixtures with one another, depending on the desired functionality.

As alkylene oxides, use is usually made, as mentioned above, of ethylene oxide and/or propylene oxide. These can be added on individually, in succession or as a mixture.

In one embodiment of the polyether alcohols used according to the invention, multimetal cyanide compounds, also referred to as DMC catalysts, can be used as catalyst in place of basic compounds. This is particularly advantageous in the case of the polyether alcohols which are made up entirely or substantially of propylene oxide. Such polyether alcohols have, in particular, a low content of unsaturated compounds, preferably less than 0.010 meq/g.

Graft polyols b4) are, as mentioned above, polyether alcohols in which olefinically unsaturated monomers have been polymerized in situ. Preferred olefinically unsaturated monomers are styrene and acrylonitrile. Preference is given to graft polyols having a hydroxyl number in the range from 20 to 40 mg KOH/g and a solids content in the range from 30 to 50% by weight. The polymers are present in the polyether alcohol in the form of a dispersion.

In a preferred embodiment of the process of the invention, the graft polyols have a bimodal particle size distribution, as described in WO 03/078496.

Chain extenders and crosslinkers can also be used together with the compounds having at least 2 groups which are reactive toward isocyanate. These are preferably H-functional compounds having molecular weights of from 62 to 400 g/mol, in particular 2- to 3-functional alcohols, amines or amino alcohols. Their amount is, in particular, from 0 to 25 parts by weight, preferably from 2 to 12 parts by weight, based on 100 parts by weight of polyether alcohol and/or polyester alcohols.

The flexible polyurethane foams of the invention are usually produced in the presence of blowing agents, catalysts and auxiliaries and/or additives.

As blowing agent, preference is given to using water. The amount of the water used depends on the desired density of the foam and is preferably in the range 1-5% by weight, based on the weight of the component b).

In place of or together with the water, it is also possible to use physically acting blowing agents. These are preferably liquids which are inert toward the polyurethane formation components and have boiling points of less than 100° C., preferably less than 50° C., in particular in the range from 50 to 30° C., and vaporize under the influence of the exothermic polyaddition reaction. Examples of such liquids are hydrocarbons such as n-pentane, isopentane and/or cyclopentane, ethers, ketones, halogenated hydrocarbons as long as they have no ozone depletion potential or noble gases. The amount of these physically acting blowing agents is usually from 1 to 20 parts by weight, preferably from 2 to 15 parts by weight, based on 100 parts by weight of the compound having at least 2 hydrogen atoms which are reactive toward isocyanate. The amount of blowing agents used depends on the desired density of the foams.

To carry out the reaction, the customary polyurethane catalysts are usually employed. These are, for example, tertiary amines such as triethylenediamine, metal salts such as tin compounds and also any mixtures of these compounds.

Auxiliaries and/or additives used are, for example, flame retardants, surface-active substances, stabilizers, cell regulators, fungistatic and bacteriostatic substances, antistatics, dyes, pigments and fillers. These materials are added to the foam system when required in order to give it particular properties.

Further details regarding the components used may be found, for example, in Kunststoff-Handbuch, Volume VII Polyurethane, Carl Hanser Verlag, Munich, Vienna, 1st to 3rd Edition, 1966, 1983 and 1993.

The compounds having at least two hydrogen atoms which are reactive toward isocyanate groups b), the blowing agents c), the catalysts and any auxiliaries and/or additives used are usually mixed to form a polyol component and reacted in this form with the polyisocyanates a).

To produce the flexible polyurethane foams of the invention, the starting compounds are usually reacted at temperatures of from 0 to 100° C., preferably from 15 to 60° C., in such ratios that from 0.5 to 2, preferably from 0.8 to 1.3 and in particular about 1, reactive hydrogen atom(s) is/are present per NCO group and, when water is used as blowing agent, the two hydrogen atoms of the water are included in the calculation of the total number of reactive hydrogen atoms.

The flexible polyurethane foams of the invention are preferably produced by the one-shot process by mixing the polyol and isocyanate components, with the polyol component comprising, as described above, the compounds having at least two hydrogen atoms which are reactive toward isocyanate, if appropriate the monools and also catalysts, blowing agents and also auxiliaries and/or additives and the isocyanate component comprising the polyisocyanate and also, if appropriate, catalysts, physical blowing agents and also auxiliaries and/or additives. The two components are intensively mixed and usually foamed as slabstock foam.

The flexible polyurethane foams of the invention display excellent viscoelastic properties since their glass transition temperature is in the vicinity of room temperature.

The glass transition temperature is, as described above, determined by means of dynamic-mechanical analysis (DMA) at a frequency of 1 Hz in a temperature range from −80 to +200° C. at a deformation of 0.3%. The temperature program is carried out in 5° C. steps. The viscoelastic flexible foams of the invention have a glass transition temperature indicated by an absolute maximum value of the loss modulus tan delta in the temperature range from −10 to 40° C., preferably from −10 to 35° C. and in particular from −6 to 35° C.

The viscoelastic foams have, in particular, a rebound resilience in accordance with DIN EN ISO 8307 of less than 30% and also a high damping behavior which is reflected in a value for tan delta of >0.2 at room temperature.

They are used, in particular, for insulating and damping elements, in particular in vehicle construction, for upholstered furniture or furniture for sitting or lying, for mattresses or cushions in the orthopedic and/or medical sector or for shoe soles or insoles. Further uses are safety components of automobiles, surfaces for depositing things, armrests and similar parts in the furniture sector and in automobile construction.

The invention is illustrated by the following examples.

EXAMPLES 1 to 9

A polyol component was prepared by mixing the polyols, catalysts and additives indicated in the table. The amounts indicated are parts by weight. The polyol component was mixed manually with 100 parts by weight of tolylene diisocyanate 80/20 at the index indicated in Examples 1 to 6 and the mixture was placed in an open metal mold having the dimensions 40×40×40 cm, where it cured to form the flexible foam. In Example 7, foaming was carried out by machine.

The foaming parameters and mechanical properties of the foams are likewise indicated in Table 1.

| Example | 1 | 2 | 3 | 4 | 5 (C) | 6 (C) | 7* |
|---|---|---|---|---|---|---|---|
| Polyol 1 | 10 | 70 | — | — | 100 | 90 | 37 |
| Polyol 2 | — | — | 40 | — | — | — | |
| Polyol 3 | — | — | — | 40 | — | — | |
| Polyol 4 | 20 | 10 | 15 | 25 | — | — | |
| Polyol 5 | — | — | — | — | — | — | |
| Polyol 6 | 50 | — | 25 | 15 | — | — | 23.3 |
| Polyol 7 | 20 | 20 | 20 | 20 | — | 10 | 9.2 |
| Polyol 8 | | | | | | | 18.5 |
| Stabilizer 1 | 0.65 | 0.35 | 0.35 | 0.5 | 0.2 | 0.25 | |
| Stabilizer 2 | — | — | — | 0.2 | 0.2 | | 0.55 |
| Catalyst 2 | 0.3 | 0.3 | 0.15- | 0.2 | 0.3 | 0.3 | 0.45 |
| Catalyst 3 | 0.1 | 0.1 | 0.05 | 0.2 | 0.1 | 0.1 | |
| Catalyst 4 | 0.15 | 0.175 | 0.1 | | 0.31 | 0.23 | 0.05 |
| Catalyst 5 | | | | 0.21 | | | 0.15 |
| Water | 2 | 2 | 2 | 2 | 2 | 2 | 2 |
| TDI | 100 | 100 | 100 | 100 | 100 | 100 | 100 |
| Cream time [sec] | 12 | 11 | 15 | 7-8 | — | — | — |
| Fiber time [sec] | 90 | 115 | 110 | 100 | | | 240** |
| Blowing-off time [sec] | 120-130 | 160-180 | 130-150 | 125-160 | | | |
| Rise height [cm] | 19.9 | 17.8 | 20.2 | 20.6 | | | |
| Rise height 20 min [cm] | 19 | 17.4 | 19 | 20 | | | |
| Tan delta (max) at ° C. | 15.05 | 14.65 | 15 | 30.8 | | | −5.7 |
| Tan delta at 20 | 0.67 | 0.62 | 0.81 | 0.66 | | | 0.28 |
| Foam density [kg/m$^3$] | 43.6 | 42.1 | 43 | 41.3 | | | 38.6 |
| Compressive strength (40%) [kPa] | 1 | 1.8 | 1.3 | 1.2 | | | 2.4 |
| Indentation resistance (40%) [kPa] | 39 | 69 | 52 | 40 | | | 93 |
| Tensile strength [kPa] | 56 | 53 | 42 | 63 | | | 55 |
| Elongation at break [%] | 298 | 163 | 149 | 209 | | | 152 |
| Comp. set (22 h/70° C./50%) [%] | 12.7 | 1.5 | 2.5 | 1.7 | | | 9.5 |

-continued

| Example | 1 | 2 | 3 | 4 | 5 (C) | 6 (C) | 7* |
|---|---|---|---|---|---|---|---|
| WCS [%] | 36.2 | 2.6 | 2.9 | 2.7 | | | 12.32 |
| Reb. res. [%] | 6 | 7 | 6 | 5 | | | 15 |

Polyol 1 Polyether alcohol based on trimethylolpropane and propylene oxide, hydroxyl number = 160 mg KOH/g
Polyol 2 Polyether alcohol based on glycerol and propylene oxide, hydroxyl number = 180 mg KOH/g
Polyol 3 Polyether alcohol based on glycerol and propylene oxide, hydroxyl number = 200 mg KOH/g
Polyol 4 Polyether alcohol based on propylene glycol and propylene oxide, hydroxyl number 55 mg KOH/g
Polyol 5 Polyether alcohol based on propylene glycol and propylene oxide, hydroxyl number = 100 mg KOH/g
Polyol 6 Polyether alcohol based on propylene glycol and propylene oxide, hydroxyl number = 240 mg KOH/g
Polyol 7 Polyether alcohol based on ethylene glycol and ethylene oxide, hydroxyl number = 190 mg KOH/g
Polyol 8 Polyethylene glycol, hydroxyl number = 280 mg KOH/g
Stabilizer 1 Tegostab ® BF 2370 Goldschmidt
Stabilizer 2 Dabco ® 198 - from Air Products
Catalyst 2 Lupragen ® N201 - amine catalyst from BASF AG
Catalyst 3 Lupragen ® N 206 - amine catalyst from BASF AG
Catalyst 4 Kosmos ® 29 - tin catalyst from Air Products
Catalyst 5 Kosmos ® EF - tin catalyst from Air Products
Reb. res.—rebound resilience
*foaming by machine
**full rise time In the case of Examples 5 and 6, no mechanical properties could be determined since the foams shrank.

The foam density was determined in accordance with DIN EN ISO 845, the compressive strength was determined in accordance with DIN EN ISO 3386-1, the indentation resistance was determined in accordance with DIN EN ISO 2439, the tensile strength was determined in accordance with DIN EN ISO 1798, the elongation at break was determined in accordance with DIN EN ISO 1798, the compression set (comp. set) was determined in accordance with DIN EN ISO 1856 and the rebound resilience (reb. res.) was determined in accordance with DIN EN ISO 8307.

The Wet Compression Set (WCS) was determined by in-house test methods.

Furthermore, the swelling behavior of the foams from Examples 1, 2 and 3 was examined.

| Foam from example | 1 | 2 | 3 |
|---|---|---|---|
| Swelling % | 7.4 | 4.3 | 5.7 |
| Volume before | 145.4 | 140.4 | 140.4 |
| Volume after | 156.2 | 146.4 | 148.4 |
| Dimensions of the test specimen before | 6.1 × 6.1 × 3.9 | 6 × 6 × 3.9 | 6 × 6 × 3.9 |
| Dimensions of the test specimen after | 6.2 × 6.3 × 4 | 6.05 × 6.05 × 4 | 6.1 × 6.1 × 4 |

To examine the swelling behavior, a test specimen of the foam was placed in water for one hour. The dimensions of the test specimen were determined before and after storage.

The results show that the foams examined are not hydrophilic.

The invention claimed is:

1. A process for producing viscoelastic flexible polyurethane foams by reacting
   a) polyisocyanates with
   b) compounds having at least two hydrogen atoms which are reactive toward isocyanate groups, in the presence of
   c) blowing agents,
   wherein the compounds having at least two hydrogen atoms which are reactive toward isocyanate groups b) comprise b1) from 70 to 10 parts by weight of at least one polyether alcohol consisting exclusively of polyoxypropylene units or polyoxypropylene units and not more than 20% by weight, based on the total weight of the alkylene oxides used, of polyoxyethylene units in the polyether chain and having a nominal functionality of from 3 to 6 and a hydroxyl number in the range from 100 to 300 mg KOH/g, b2) from 10 to 70 parts by weight of at least one polyetherol consisting exclusively of polyoxypropylene units or polyoxypropylene units and not more than 20% by weight, based on the total amount of alkylene oxides used, of polyoxyethylene units in the polyether chain and having a nominal functionality of 2 and a hydroxyl number in the range from 50 to 240 mg KOH/g, b3) from 10 to 30 parts by weight of at least one polyether alcohol consisting exclusively of ethylene oxide units or ethylene oxide units and not more than 20% by weight, based on the total amount of alkylene oxides used, of polyoxypropylene units in the polyether chain and having a nominal functionality of from 2 to 3 and a hydroxyl number in the range from 50 to 550 mg KOH/g, and b4) from 0 to 20 parts by weight of at least one graft polyetherol which can be prepared by in-situ polymerization of olefinically unsaturated monomers in a polyether alcohol consisting of polyoxypropylene units or polyoxypropylene units and not more than 50% by weight, based on the total amount of alkylene oxides used, of polyoxyethylene units in the polyether chain and having a nominal functionality of from 2 to 3 and a hydroxyl number in the range from 20 to 40 mg KOH/g wherein pbw is based on 100 pbw of component b).

2. The process according to claim 1, wherein the functionality of the mixture of b1 and b2 is in the range from >2 to 3.

3. The process according to claim 1, wherein the ratio of the parts by weight of the sum of b1 and b2 to b3 (b1+b2)/b3 is in the range from 90/10 to 70/30.

4. The process according to claim 1, wherein the sum of b1 and b2 to b4 (b1+b2)/b4 is in the range from 100/0 to 80/20.

5. The process according to claim 1, wherein when two alkylene oxides are used in the preparation of the polyether alcohols b1 to b4, the alkylene oxides are incorporated in the form of blocks.

6. The process according to claim 1, wherein when two alkylene oxides are used in the preparation of the polyether alcohols b1 to b4, the alkylene oxides are incorporated randomly.

7. The process according to claim 1, wherein diphenylmethane diisocyanate is used as polyisocyanate a.

8. The process according to claim 1, wherein mixtures of diphenylmethane diisocyanate and polyphenylenepolymethylene polyisocyanates are used as polyisocyanate a.

9. The process according to claim 1, wherein tolylene diisocyanate is used as polyisocyanate a.

10. The process according to claim 1, wherein water is used as a blowing agent.

11. The process according to claim 1, wherein water is used as a blowing agent in an amount of from 1 to 5% by weight, based on the amount of all starting components.

12. A viscoelastic flexible polyurethane foam which is produced according to the process of claim 1.

13. The process of claim 1, wherein said viscoelastic flexible polyurethane has a glass transition temperature of from −10 to 40° C.

14. The process of claim 1, wherein said viscoelastic flexible polyurethane has a glass transition temperature of from −10 to 35° C.

15. The process of claim 1, wherein said viscoelastic flexible polyurethane has a glass transition temperature of from −6 to 35° C.

16. The process of claim 1, wherein said viscoelastic flexible polyurethane has a rebound resistance according to DIN EN ISO 8307 of less than 30%.

17. The process of claim 1, wherein said viscoelastic flexible polyurethane has a tan delta of >0.2 at room temperature.

18. A process for producing viscoelastic flexible polyurethane foams by reacting a) polyisocyanates with
b) compounds having at least two hydrogen atoms which are reactive toward isocyanate groups, in the presence of
c) blowing agents,
wherein the compounds having at least two hydrogen atoms which are reactive toward isocyanate groups b comprise
b1) from 70 to 10 parts by weight of at least one polyether alcohol consisting exclusively of polyoxypropylene units or polyoxypropylene units and not more than 20% by weight, based on the total weight of the alkylene oxides used, of polyoxyethylene units in the polyether chain and having a nominal functionality of from 3 to 6 and a hydroxyl number in the range from 100 to 300 mg KOH/g,
b2) from 10 to 70 parts by weight of at least one polyetherol consisting exclusively of polyoxypropylene units or polyoxypropylene units and not more than 20% by weight, based on the total amount of alkylene oxides used, of polyoxyethylene units in the polyether chain and having a nominal functionality of 2 and a hydroxyl number in the range from 50 to 350 mg KOH/g,
b3) from 10 to 30 parts by weight of at least one polyether alcohol consisting exclusively of ethylene oxide units or ethylene oxide units and not more than 20% by weight, based on the total amount of alkylene oxides used, of polyoxypropylene units in the polyether chain and having a nominal functionality of from 2 to 3 and a hydroxyl number in the range from 50 to 550 mg KOH/g, and
b4) from 0 to 20 parts by weight of at least one graft polyetherol which can be prepared by in-situ polymerization of olefinically unsaturated monomers in a polyether alcohol consisting of polyoxypropylene units or polyoxypropylene units and not more than 50% by weight, based on the total amount of alkylene oxides used, of polyoxyethylene units in the polyether chain and having a nominal functionality of from 2 to 3 and a hydroxyl number in the range from 20 to 40 mg KOH/g
wherein pbw is based on 100 pbw of component b), wherein compound b1) has a functionality of from 5-6.

* * * * *